(12) United States Patent
Stuesgen et al.

(10) Patent No.: US 8,834,997 B2
(45) Date of Patent: Sep. 16, 2014

(54) CARBON FIBER

(75) Inventors: Silke Stuesgen, Dusseldorf (DE); Bernd Wohlmann, Dusseldorf (DE); Matthias Schubert, Wuppertal (DE)

(73) Assignee: Toho Tenax Europe GmbH, Wuppertal (DE)

( * ) Notice: Subject to any disclaimer, the term of this patent is extended or adjusted under 35 U.S.C. 154(b) by 1208 days.

(21) Appl. No.: 12/226,581

(22) PCT Filed: Apr. 19, 2007

(86) PCT No.: PCT/EP2007/003421
§ 371 (c)(1),
(2), (4) Date: Oct. 22, 2008

(87) PCT Pub. No.: WO2007/124867
PCT Pub. Date: Nov. 8, 2007

(65) Prior Publication Data
US 2009/0092831 A1    Apr. 9, 2009

(30) Foreign Application Priority Data

Apr. 28, 2006  (EP) ................................... 06008904

(51) Int. Cl.
*D02G 3/36*    (2006.01)
*C08J 5/06*    (2006.01)
*D06M 15/55*    (2006.01)
*D06M 101/40*    (2006.01)

(52) U.S. Cl.
CPC .............. *C08J 5/06* (2013.01); *D06M 2200/50* (2013.01); *D06M 2101/40* (2013.01); *C08J 2363/00* (2013.01); *D06M 15/55* (2013.01)
USPC ........... 428/367; 428/375; 428/378; 428/392; 428/391; 428/408

(58) Field of Classification Search
None
See application file for complete search history.

(56) References Cited

U.S. PATENT DOCUMENTS

| | | | | |
|---|---|---|---|---|
| 3,424,707 A * | 1/1969 | Schaufelberger | ............. | 523/400 |
| 3,657,082 A * | 4/1972 | Wells et al. | .................. | 205/768 |
| 3,671,411 A * | 6/1972 | Ray et al. | ....................... | 205/674 |
| 3,859,187 A * | 1/1975 | Druin et al. | ................... | 428/367 |
| 3,894,884 A * | 7/1975 | Druin et al. | .................. | 134/25.1 |
| 3,914,504 A * | 10/1975 | Weldy | ............................. | 428/367 |
| 4,107,128 A * | 8/1978 | Hosoi et al. | ..................... | 523/434 |
| 4,420,512 A * | 12/1983 | Ogawa et al. | ................. | 427/386 |
| 4,446,255 A * | 5/1984 | Ying et al. | ..................... | 523/205 |
| 4,482,660 A * | 11/1984 | Minamisawa et al. | ........ | 523/428 |
| 4,853,449 A * | 8/1989 | Domeier | ......................... | 526/259 |
| 4,880,881 A * | 11/1989 | Minami | .......................... | 525/438 |
| 4,904,818 A * | 2/1990 | Minami et al. | .................. | 560/85 |
| 5,439,986 A * | 8/1995 | Hosogane et al. | ............ | 525/423 |
| 5,587,240 A * | 12/1996 | Kobayashi et al. | ............ | 428/367 |
| 5,599,629 A * | 2/1997 | Gardner et al. | ................ | 428/413 |
| 5,747,565 A * | 5/1998 | Ono et al. | ....................... | 523/413 |
| 5,854,313 A * | 12/1998 | Omori et al. | .................. | 523/406 |
| 5,910,456 A * | 6/1999 | Matsuhisa et al. | ............. | 442/179 |
| 6,287,696 B1 * | 9/2001 | Noda et al. | .................. | 428/411.1 |
| 6,399,199 B1 * | 6/2002 | Fujino et al. | ................... | 428/396 |
| 7,709,582 B2 * | 5/2010 | Kouchi et al. | ................. | 525/523 |
| 7,754,322 B2 * | 7/2010 | Tilbrook et al. | ........... | 428/297.4 |
| 7,968,179 B2 * | 6/2011 | Tilbrook et al. | ........... | 428/297.4 |
| 8,273,454 B2 * | 9/2012 | Schneider et al. | ............. | 428/364 |
| 2009/0092831 A1 * | 4/2009 | Stusgen et al. | ................ | 428/367 |

FOREIGN PATENT DOCUMENTS

| | | | | |
|---|---|---|---|---|
| EP | 0 640 702 A1 | 3/1995 | | |
| EP | 0 947 562 A1 | 10/1999 | | |
| EP | 1270206 A1 * | 1/2003 | ............. | B23B 27/26 |
| EP | 1 413 670 A1 | 4/2004 | | |
| EP | 1505092 A2 * | 2/2005 | ............. | C08F 222/10 |
| JP | 58210050 A * | 12/1983 | ............. | C07C 91/12 |
| JP | A-09-255802 | 9/1997 | | |
| JP | A-2002-327041 | 11/2002 | | |
| JP | A-2003-206362 | 7/2003 | | |
| JP | A 2004-285488 | 10/2004 | | |
| JP | A-2005-290614 | 10/2005 | | |
| JP | A-2005-290616 | 10/2005 | | |
| WO | WO 9101394 A1 * | 2/1991 | ............. | D01F 11/14 |
| WO | WO 99/19407 A1 | 4/1999 | | |
| WO | WO 2005095080 A1 * | 10/2005 | ............. | B29B 15/12 |

* cited by examiner

*Primary Examiner* — Jill Gray
(74) *Attorney, Agent, or Firm* — Oliff PLC

(57) ABSTRACT

Carbon fibers and carbon fiber yarn consisting of carbon fibers, the fibers having been pretreated by electrochemical oxidation, characterized in that they have a finish consisting of epoxy resin(s), a vinyl component, and a plasticizer in an amount of 0.3 to 5 wt. % relative to the carbon fibers, which are to be provided with the finish.

9 Claims, No Drawings

CARBON FIBER

The invention relates to carbon fibers and a carbon fiber yarn comprising such carbon fibers.

Carbon fibers are widely known. A large field of application for carbon fibers is the reinforcement of plastics. Steadily increasing importance is being attached to the interaction between carbon fibers and the plastic to be reinforced in order to make the reinforced plastic suitable for higher demands.

The object of the present invention is to provide carbon fibers especially suitable for the reinforcement of plastics. These carbon fibers should be suitable in particular for the reinforcement of polyvinyl esters (PVE).

The object of the invention is achieved through carbon fibers, which have been pretreated by electrochemical oxidation, and have a finish consisting of epoxy resin(s), a vinyl component, and a plasticizer, the finish being in an amount of 0.3 to 5 wt. % relative to the carbon fibers provided with the finish.

Similar compositions are known indeed as a matrix for prepregs (WO 99/19407). These compositions, however, have additional constituents, such as e.g. hardeners, which make special storage of the prepregs necessary in order to avoid curing of the matrix. It must be regarded as surprising that the use of certain constituents of a composition known as a matrix for prepregs makes it possible to use this modified composition as a finish for carbon fibers. Carbon fibers that include this finish are excellently suitable for the reinforcement of PVE. It is no longer necessary to manufacture such complex compositions for the matrix as are described in the prior art. At the same time, the carbon fibers according to the invention can be wound up on spools and can be stored for longer periods without special measures.

Preferably, the carbon fibers according to the invention have the finish in an amount of 1.0 to 1.5 wt. % relative to the total weight of the carbon fibers with the finish.

It has proved particularly advantageous, if for the finish of the carbon fibers according to the invention, a mixture E is selected as the epoxy resin, whereby the mixture consists of at least two epoxy resins E1 and E2, E1 having an epoxy value in the range of 2,000 to 2.300 mmol/kg resin, and E2 having an epoxy value in the range of 500 to 650 mmol/kg resin, and the weight ratio E1:E2 of the epoxy resins E1 and E2 in the mixture being so chosen that the resin mixture has an epoxy value between 550 and 2.100 mmol/kg resin.

The carbon fibers according to the invention have in particular a finish, which comprises 10 to 40 wt. % of the epoxy resin mixture, 10 to 40 wt. % of the vinyl component, and 20 to 50 wt. % of the plasticizer, whereby the sum of all components adds up to 100 wt. %. Preferably, the carbon fibers according to the invention have a finish, which comprises 20 to 35 wt. % of the epoxy resin mixture, 20 to 35 wt. % of the vinyl component, and 25 to 40 wt. % of the plasticizer, whereby again, all of the components together add up to 100 wt. %.

Especially advantageous is the use of a multifunctional vinyl component. An example of such a vinyl component is tetramethacrylate ester of N,N,N',N'-tetraglycidyl-m-xylenediamine.

As plasticizers, in particular such substances that show a thermoplastic, that is, a ductile behavior, have proven to be suitable, for example, aromatic polyhydroxyethers or resins modified with NBR rubber (acrylonitrile butadiene rubber).

The carbon fibers according to the invention distinguish themselves in particular in that, if they are processed into a test sample with a matrix of polyvinyl ester resin, they show an apparent interlaminar shear strength according to EN 2563 of at least 65 MPa, and an interlaminar fracture toughness energy according to EN 6033 of 750 J/m$^2$, whereby the test sample corresponds to the quality required of carbon fiber reinforced test plates per EN 2565.

The carbon fibers currently on the market show, embedded in the manner described in EN 2565, Method A, an apparent interlaminar shear strength of 57 MPa (HTS 5631, 12K from the applicant) and 61 MPa (T 700 SC FOE, 12K from Toray) respectively, and an interlaminar fracture toughness energy of 479 J/m$^2$ (HTS 5631, 12K) and 1078 J/m$^2$ (T 700 SC FOE) respectively. Thus, the present invention provides new carbon fibers with a surprisingly good combination of characteristics in connection with polyvinyl esters.

In particular, the carbon fibers according to the invention have, when processed into a test sample according to EN 2565, an apparent interlaminar shear strength according to EN 2563 between 65 and 80 MPa, and an interlaminar fracture toughness energy according to EN 6033 between 750 and 1500 J/m$^2$.

In regards to the standards cited, the references are to the EN 2563 version published March 1997, the EN 6033 version published April 1996, and the EN 2565 version published September 1993.

An object of the present invention is also a carbon fiber yarn, which contains 3,000 to 24,000, in particular 12,000 to 24,000 carbon fiber filaments consisting of carbon fibers according to the invention.

Regarding the quality of the carbon fiber reinforced test plates per EN 2565, it was determined according to 5.3.4, that every carbon fiber reinforced test plate should have an ultrasound C-scan image, produced using a Krautkrämer H5M probe, in which not more than 5% of the scanned surface shows an attenuation of more than 5 dB.

For the polyvinyl ester resin of the matrix, a polyvinyl ester resin system for the manufacture of the carbon fiber reinforced test plates was used, which has the following composition:

100 g DERAKANE 8084, available from DOW Derakane
2 g BUTANOX LPT, available from Akzo Nobel Chemicals by
1 g NL 49 P, available from Akzo Nobel Chemicals by
0.05 g NL 63-10 P, available from Akzo Nobel Chemicals by Because the polyvinyl ester resin system cures very quickly (pot time approx. 30 min), it is recommended, following Method A described in EN 2565 (wet application method), that the yarn should be wound up under constant yarn tension on a winding plate having 2 parallel forms lying opposite each other and with lateral bars for limiting the coiling width, and that the carbon fibers be impregnated with the resin system during the winding. The impregnation occurs preferably by means of roller impregnation, during which the resin amount to be applied is regulated by a doctor blade. The winding on to the plate is performed in such a manner that per layer a fiber mass per unit area of 267 g/m$^2$ with a thickness of 0.25 mm is created.

During the subsequent processing, the two laminate structures located on the opposing surfaces are initially cured for 24 hours at 23° C., and subsequently tempered for 15 hours at 60° C., during which period they are maintained at a pressure of 5 bar. The requisite laminate thickness is guaranteed by use of spacing strips. The use of bleeder cloths for absorbing excess resin as well as slicing the laminate structures on the front face of the winding plate after reaching the pot time to reduce internal tensions are additional measures taken in order to achieve the quality required for carbon fiber reinforced test plates per EN 2565; whereby all steps are coordinated, such that the resin portion of the finished test sample is 40±4 wt. %.

The invention will now be described in more detail by way of the following examples.

For the manufacture of the carbon fibers according to the invention, the following substances are used for the finish in the following examples:

A mixture E is used as the epoxy component, whereby the mixture consists of two epoxy resins E1 and E2, E1 having an epoxy value of 2.000 mmol/kg resin, and E2 having an epoxy value of 540 mmol/kg resin, and the weight ratio E1:E2 of the epoxy resins E1 and E2 having a value of 1.2.

Tetramethacrylate ester of N,N,N',N'-tetraglycidyl-m-xylenediamine was used as vinyl component V.

The following substances were used as plasticizers:

P1: HYDROSIZE HP3-02, offered by Hydrosize Technologies, Inc. This substance is a modified, aromatic polyhydroxyether.

The carbon fiber yarns used for the finish contained 12,000 and 24,000 carbon fiber filaments respectively, which had been treated by electrochemical oxidation. The yarns were coated with different finishing mixtures and finally dried. The mixtures used for the finish, the quantity applied to the yarn and the characteristics of the yarns are itemized in the following table.

TABLE

| Finish | Number of filaments | Quantity applied Wt. % | Apparent interlaminar shear strength MPa | Interlaminar fracture toughness energy J/m² |
|---|---|---|---|---|
| 2% E, 2% V, 2% P1 in water | 24,000 | 1.1 | 70 | 1319 |
| 2% E, 2% V, 2% P1 in water | 24,000 | 1.5 | 69 | 1138 |
| 2% E, 2% V, 2% P1 in water | 24,000 | 0.4 | 69 | 1020 |
| 1.33% E, 1.33% V, 1.33% P1 in water | 12,000 | 1.1 | 69 | 1013 |

As is clear from the table, using the PVE matrix DERAKANE 8084 results in surprisingly high values for the apparent interlaminar shear strength and the interlaminar fracture toughness energy.

The invention claimed is:

1. Carbon fibers, which have been pretreated by electrochemical oxidation, wherein the carbon fibers have:
   a finish consisting of an epoxy resin or epoxy resins as a first component,
   a multifunctional vinyl compound as a second component, and
   a plasticizer as a third component,
   the finish being in an amount of 0.3 to 5 wt. % relative to the carbon fibers provided with the finish, and
   the multifunctional vinyl compound being tetramethacrylate ester of N,N,N',N'-tetraglycidyl-m-xylenediamine,
   wherein the finish comprises 10 to 40 wt. % of the first component, 10 to 40 wt % of the second component, and 20 to 50 wt. % of the third component.

2. Carbon fibers according to claim 1, wherein the carbon fibers have the finish in an amount of 1.0 to 1.5 wt. % relative to the carbon fibers provided with the finish.

3. Carbon fibers according to claim 1, wherein the epoxy resin is a mixture E comprising at least two epoxy resins E1 and E2, E1 having an epoxy value in the range of 2,000 to 2,300 mmol/kg resin, and E2 having an epoxy value in the range of 500 to 650 mmol/kg resin, and the weight ratio E1:E2 of the epoxy resins E1 and E2 in the mixture being such that the resin mixture has an epoxy value of from 550 to 2100 mmol/kg resin.

4. Carbon fibers according to claim 1, wherein the plasticizer is a substance that shows a thermoplastic and ductile behavior.

5. Carbon fibers according to claim 1, wherein polyhydroxyethers or resins modified with NBR rubber are used as the plasticizer.

6. A carbon fiber reinforced polyvinyl ester resin comprising:
   a carbon fiber of claim 1; and
   a matrix of polyvinyl ester resin, wherein,
       the carbon fiber has an apparent interlaminar shear strength according to EN 2563 of at least 65 MPa, and an interlaminar fracture toughness energy according to EN 6033 of 750 J/m², and the test sample corresponds to the quality required per EN 2565 for carbon fiber reinforced test plates.

7. The carbon fiber reinforced polyvinyl ester resin according to claim 6, wherein the carbon fiber has an apparent interlaminar shear strength according to EN 2563 of from 65 to 80 MPa, and an interlaminar fracture toughness energy according to EN 6033 of from 750 to 1500 J/m².

8. Carbon fiber yarn containing 3,000 to 24,000 carbon filaments comprising carbon fibers according to claim 1.

9. Carbon fiber yarn containing 12,000 to 24,000 carbon filaments comprising carbon fibers according to claim 1.

* * * * *

UNITED STATES PATENT AND TRADEMARK OFFICE
CERTIFICATE OF CORRECTION

| | |
|---|---|
| PATENT NO. | : 8,834,997 B2 |
| APPLICATION NO. | : 12/226581 |
| DATED | : September 16, 2014 |
| INVENTOR(S) | : Stuesgen et al. |

It is certified that error appears in the above-identified patent and that said Letters Patent is hereby corrected as shown below:

In the Specification

Col. 2 Line 40-44 should read 2 g BUTANOX LPT, available from Akzo Nobel Chemi-
  cals bv
1 g NL 49 P, available from Akzo Nobel Chemicals bv
0.05 g NL 63-10 P, available from Akzo Nobel Chemicals
  bv Signed and Sealed this
Eleventh Day of November, 2014

Michelle K. Lee
*Deputy Director of the United States Patent and Trademark Office*